(12) United States Patent
Fryer et al.

(10) Patent No.: US 12,193,593 B2
(45) Date of Patent: Jan. 14, 2025

(54) KETTLE

(71) Applicant: Breville Pty Limited, Alexandria (AU)

(72) Inventors: Scott Fryer, Alexandria (AU); Tee Smith, Alexandria (AU); Nicholas Edmonds, Alexandria (AU); Xiang Ren, Mascot (AU); Con Psarologos, Bardwell Valley (AU); Ali Tofaili, Alexandria (AU); Sam Walker, Alexandria (AU); Tae-Kyung Kong, Alexandria (AU); Barnaby Ward, Alexandria (AU); Gerard White, Alexandria (AU)

(73) Assignee: Breville Pty Limited, Alexandria (AU)

( * ) Notice: Subject to any disclaimer, the term of this patent is extended or adjusted under 35 U.S.C. 154(b) by 691 days.

(21) Appl. No.: 17/598,533

(22) PCT Filed: Mar. 30, 2020

(86) PCT No.: PCT/AU2020/050312
§ 371 (c)(1),
(2) Date: Sep. 27, 2021

(87) PCT Pub. No.: WO2020/198788
PCT Pub. Date: Oct. 8, 2020

(65) Prior Publication Data
US 2022/0175172 A1    Jun. 9, 2022

(30) Foreign Application Priority Data

Mar. 29, 2019  (AU) ................................ 2019901058
Aug. 15, 2019  (AU) ................................ 2019902965

(51) Int. Cl.
A47J 27/21        (2006.01)

(52) U.S. Cl.
CPC ..... *A47J 27/21166* (2013.01); *A47J 27/2105* (2013.01); *A47J 27/21066* (2013.01); *A47J 27/21091* (2013.01)

(58) Field of Classification Search
CPC .............. A47J 27/21166; A47J 27/2015; A47J 27/20166; A47J 27/21091;
(Continued)

(56) References Cited

U.S. PATENT DOCUMENTS

2005/0284861 A1    12/2005  Fung
2022/0151426 A1*   5/2022   Hewins ................ A47J 31/402
(Continued)

FOREIGN PATENT DOCUMENTS

CN    108851978 A    11/2018
CN    109419348 A    3/2019
(Continued)

OTHER PUBLICATIONS

International Search Report for application No. PCT/AU2020/050312 dated May 22, 2020.
(Continued)

*Primary Examiner* — Shawntina T Fuqua
(74) *Attorney, Agent, or Firm* — MOSER TABOADA

(57) ABSTRACT

An appliance (210) to heat a liquid, the appliance (21) including: a vessel (212) to receive the liquid to be heated, the vessel (212) having a generally central upright longitudinal axis (218), a bottom housing (220), and a side wall (222) extending upwardly from the bottom housing (220), with a portion of the bottom housing (220) and side wall (222) at least partly enclosing a chamber (234) within which the liquid is heated; and a heating element (238) in thermal communication with the chamber (234) so that heat generated by the element (238) can be delivered to the liquid via convection, wherein the housing (210) includes a deform-
(Continued)

able sealing member (268) sealingly associated with the element (238) to sealingly connect the element (238) and bottom housing (220), with the member (268) inhibiting transmission of sound from the chamber (234).

18 Claims, 15 Drawing Sheets

(58) Field of Classification Search
CPC .......... A47J 27/21175; A47J 27/21016; G10K 11/162; G10K 11/16
See application file for complete search history.

(56) References Cited

U.S. PATENT DOCUMENTS

| | | | |
|---|---|---|---|
| 2023/0255389 A1* | 8/2023 | Moughton | A47J 27/2105 222/146.5 |
| 2023/0363567 A1* | 11/2023 | Ishida | A47J 27/21016 |

FOREIGN PATENT DOCUMENTS

| | | | | |
|---|---|---|---|---|
| CN | 111248741 B | * | 9/2021 | ........ A47J 27/21008 |
| DE | 69910414 T2 | | 6/2004 | |
| GB | 2330064 A | | 4/1999 | |
| GB | 2363055 A | | 12/2001 | |
| GB | 2408918 A | | 6/2005 | |
| GB | 2480360 A | | 11/2011 | |
| WO | WO-9618331 A1 | | 6/1996 | |
| WO | WO-2013093506 A2 | * | 6/2013 | ........ A47J 27/21008 |

OTHER PUBLICATIONS

Supplementary European Search Report for EP 20784439 dated Nov. 25, 2022.

* cited by examiner

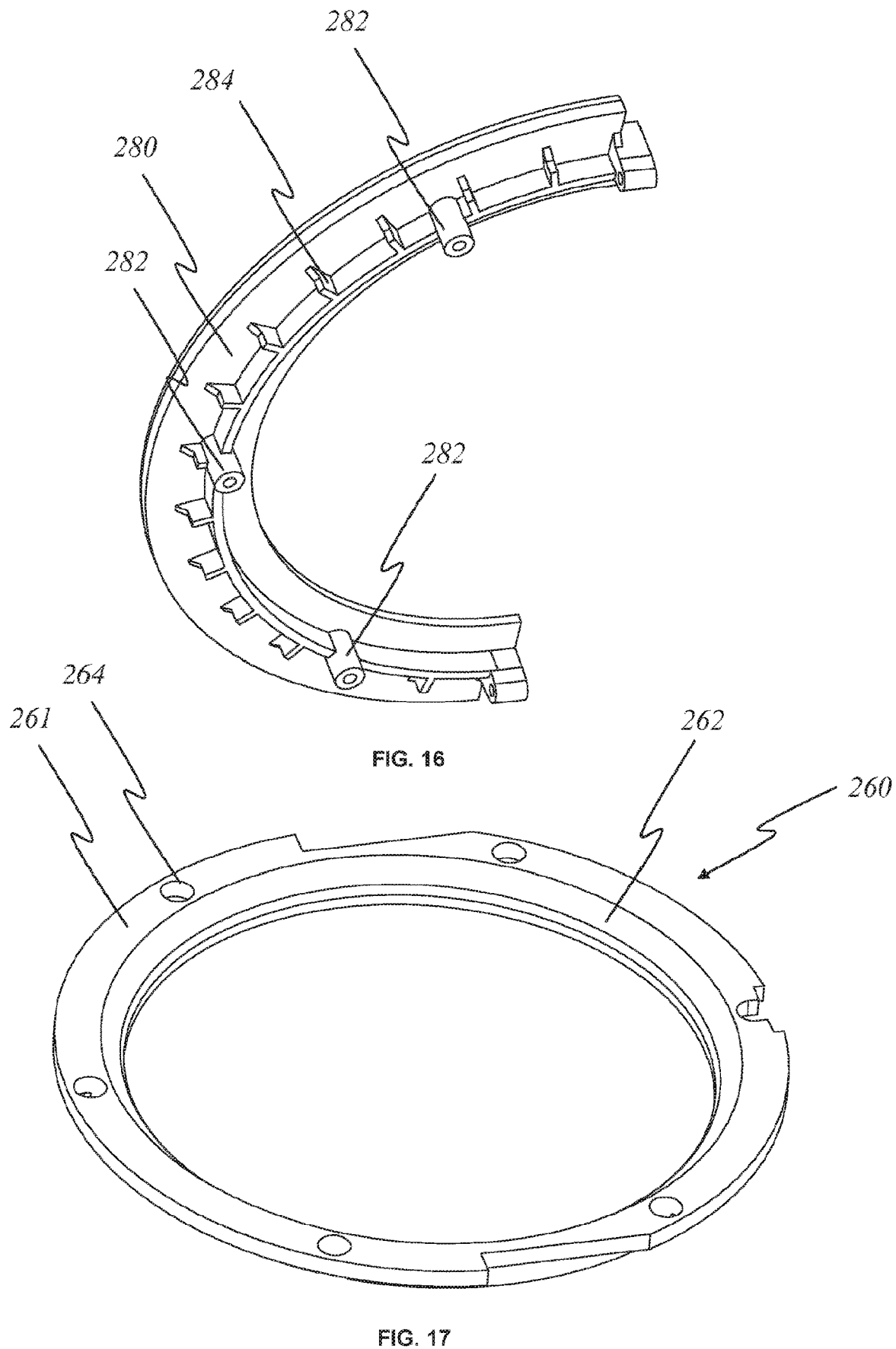

KETTLE

FIELD

The present invention relates to appliances to heat liquids, and more particularly, but not exclusively to electrically operated jugs and kettles.

BACKGROUND

Kettles are well-known devices to rapidly boil water for, for example, making tea, cooking, or the like. A disadvantage of presently known kettles is that as water is heated by a heating element, a small quantity of water close to the heating element is heated to above its boiling point. The quantity of water changes phase to steam and collects as a steam bubble at a steam bubble initiation site, usually a surface imperfection. As the steam bubble has a lower density than water the steam bubble rises due to buoyancy. As the steam bubble rises, the temperature of the surrounding water is below boiling temperature, causing the steam bubble to also cool down below boiling temperature. As the steam bubble cavitates, significant sound waves are created. The noise caused by the cavitation is undesirable in a home environment. Also, it is difficult to spread the heat over a kettle surface of a tube heating element of the kind used in a variety of kettles. Therefore, water adjacent the tube heating element tends to heat up faster as opposed to water away from it creating an imbalance in temperature and magnifying the cavitation.

Object

It is an object of the present invention to substantially overcome, or at least ameliorate, one or more of the above disadvantages.

SUMMARY OF INVENTION

The present invention provides an appliance to heat a liquid, the appliance including:
  a vessel to receive the liquid to be heated, the vessel having a generally central upright longitudinal axis, a bottom housing, and a side wall extending upwardly from the bottom housing, with a portion of the bottom housing and side wall at least partly enclosing a chamber within which the liquid is heated; and
  a heating element in thermal communication with the chamber so that heat generated by the element can be delivered to the liquid via convection, wherein
  the housing includes a deformable sealing member sealingly associated with the element to sealingly connect the element and bottom housing, with the member inhibiting transmission of sound from the chamber.

Preferably, the deformable sealing member is a second deformable sealing member and the appliance further includes a first deformable sealing member sealingly associated with the side wall to sealingly connect the side wall and bottom housing, with the members inhibiting transmission of sound from the chamber.

Preferably, the housing includes a support structure having a plurality of protrusions to apply pressure locally on an underside of the second sealing member to inhibit transmission of sound from the chamber to the housing.

There is also disclosed herein an appliance to heat a liquid, the appliance including:
  a vessel to receive the liquid to be heated, the vessel having a generally central upright longitudinal axis, a bottom housing, and a side wall extending upwardly from the bottom housing, with a portion of the bottom housing and side wall at least partly enclosing a chamber within which the liquid is heated; and
  a heating element in thermal communication with the chamber so that heat generated by the element can be delivered to the liquid via convection, wherein
  the housing includes a first deformable sealing member sealingly associated with the side wall to sealingly connect the side wall and bottom housing, and a second deformable sealing member sealingly associated with the element to sealingly connect the element and bottom housing, with the members inhibiting transmission of sound from the chamber.

Preferably, the members inhibit transmission of sound from the chamber to the housing.

Preferably, the first deformable sealing member includes a groove extending generally upwardly and parallel with the axis, with the groove being configured to receive a lower portion of the side wall such that at least a portion of the first deformable sealing member is located on either side of the lower portion of the side wall.

Preferably, the second deformable sealing member includes a slot extending transversely relative to the axis, with the slot of the second deformable sealing member being configured to receive a portion of the element such that the portion of the element is spaced from the lower portion of the side wall.

Preferably, the portion of the element is a periphery of the element.

Preferably, the housing includes a chassis, with the chassis having a recess to receive the portion of the first deformable sealing member.

Preferably, the second deformable sealing member is positioned adjacent to the chassis.

Preferably, the members are resiliently deformable.

Preferably, the members are formed of silicone material.

Preferably, the appliance further includes a sound-absorbing layer positioned relative to the members to inhibit transmission of sound from the chamber.

Preferably, the layer is formed of foam material.

Preferably, the element is a printed heating element to distribute heat generally evenly over a heating surface of the element to at least minimize occurrence of cavitation of the liquid as the liquid is heated.

There is also disclosed herein an appliance to heat a liquid, the appliance including:
  a vessel to receive the liquid to be heated, the vessel having a generally central upright longitudinal axis, a bottom housing, and a side wall extending upwardly from the bottom housing, with a portion of the bottom housing and side wall at least partly enclosing a chamber within which the liquid is heated; and
  a heating element in thermal communication with the chamber so that heat generated by the element can be delivered to the liquid via conduction, wherein
  the housing includes:
    a first deformable sealing member sealingly connecting the side wall and bottom housing; and
    a second deformable sealing member sealingly connecting the element, side wall and bottom housing,
  with a portion of the side wall being located between the sealing members, and
  with the sealing members inhibiting transmission of sound from the chamber.

Preferably, the appliance further includes a compression member to apply pressure locally to one of the sealing members so as to cause compression between the sealing members and the portion of the side wall to at least minimize liquid egress from the chamber.

Preferably, the sealing members and the compression member inhibit transmission of sound from the chamber to the housing.

Preferably, the side wall includes a lower portion located within the housing, with the lower portion being inclined towards the axis, wherein the first deformable sealing member includes a first sealing face in sealing engagement with an outer surface of the lower portion, and wherein the second deformable sealing member includes a second sealing face in sealing engagement with an inner surface of the lower portion.

Preferably, the second deformable sealing member includes an outer portion, an inner portion, and a bridge portion connecting the outer and inner portions, with the outer portion providing the second sealing face.

Preferably, the housing includes a chassis, with the chassis having a recess to receive both the sealing members.

Preferably, the sealing members are resiliently deformable.

Preferably, the appliance further includes a sound-absorbing layer positioned relative to the sealing members to inhibit transmission of sound from the chamber.

Preferably, the layer is formed of foam material.

Preferably, the appliance further includes a controller to supply power to the element, with the controller being arranged between the layer and the housing.

Preferably, the element is resiliently supported by the controller to at least minimize resonance from the element.

Preferably, the element is resiliently supported by one or more electrical spring contacts.

Preferably, the element is a printed heating element to distribute heat generally evenly over a heating surface of the element to at least minimize occurrence of cavitation of the liquid as the liquid is heated.

Preferably, the housing is overmoulded to at least aid in inhibiting transmission of sound.

BRIEF DESCRIPTION OF DRAWINGS

Preferred embodiments of the present invention will now be described, by way of examples only, with reference to the accompanying drawings in which:

FIG. 16 is a schematic perspective view of a part of a compression member of the kettle of FIG. 7;

FIG. 17 is a schematic perspective view of a second sealing member of the kettle of FIG. 7;

DESCRIPTION OF EMBODIMENTS

In FIGS. 1 to 6 of the accompanying drawings there is schematically depicted an appliance to heat water, preferably the appliance is a kettle 110. The kettle 110 includes a vessel or jug 112 and a heater base 114 upon which the jug 112 rests. The base 114 delivers electric power to the jug 112.

Figure 6:
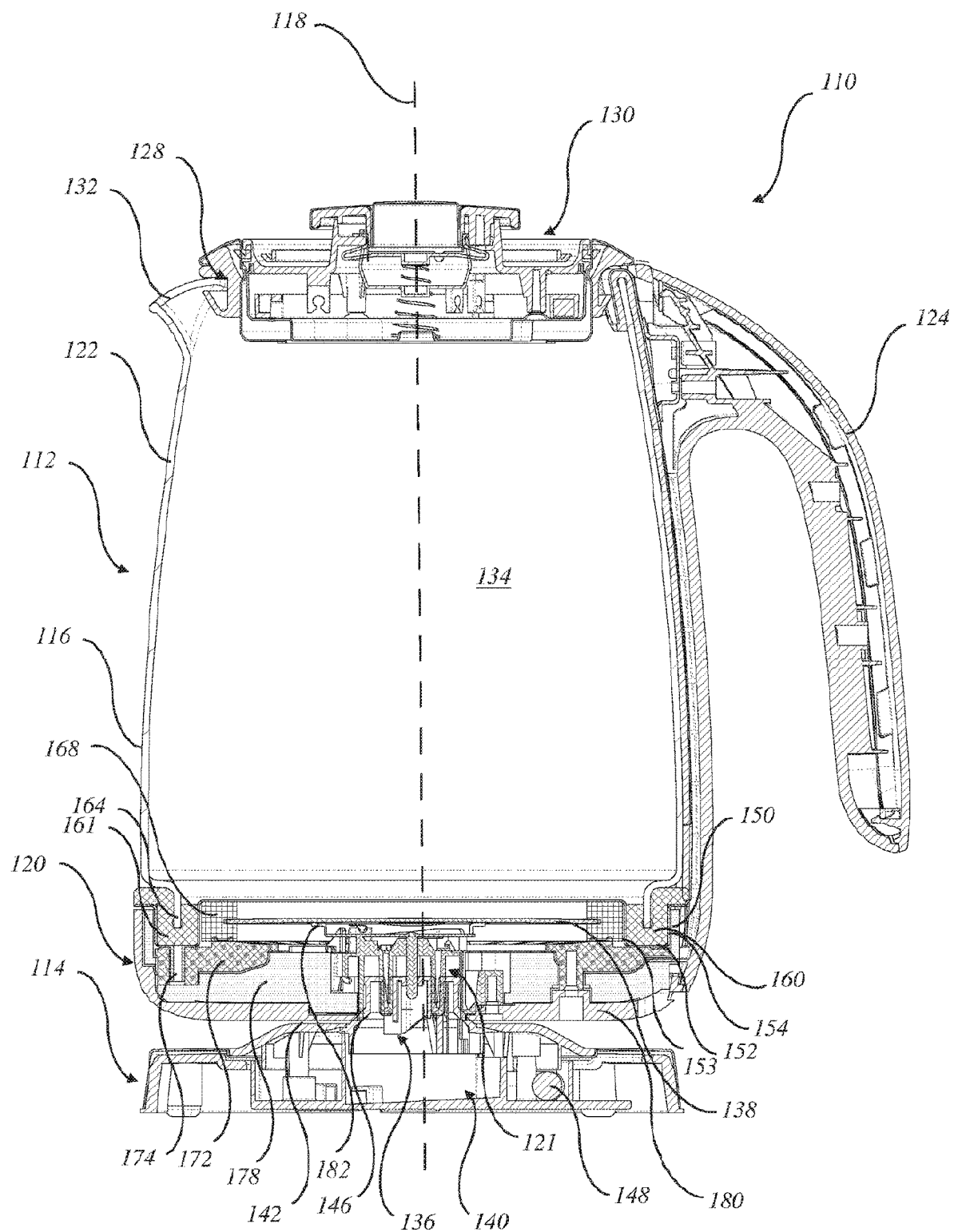
FIG. 6 is a schematic section view of the kettle of FIG. 1.
Figure 7:
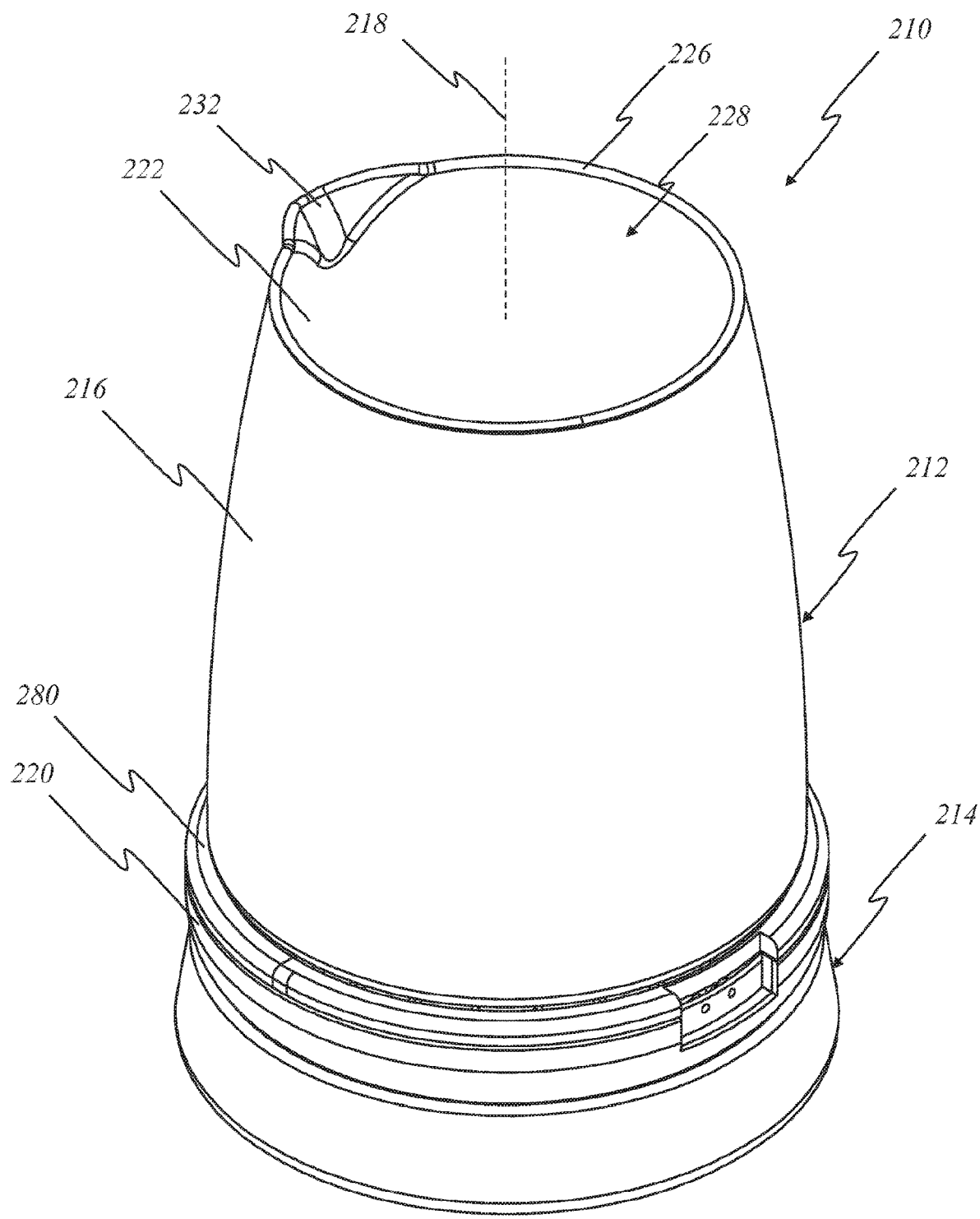
FIG. 7 is a schematic isometric view of a kettle according to an embodiment of the present invention.
Figure 8:
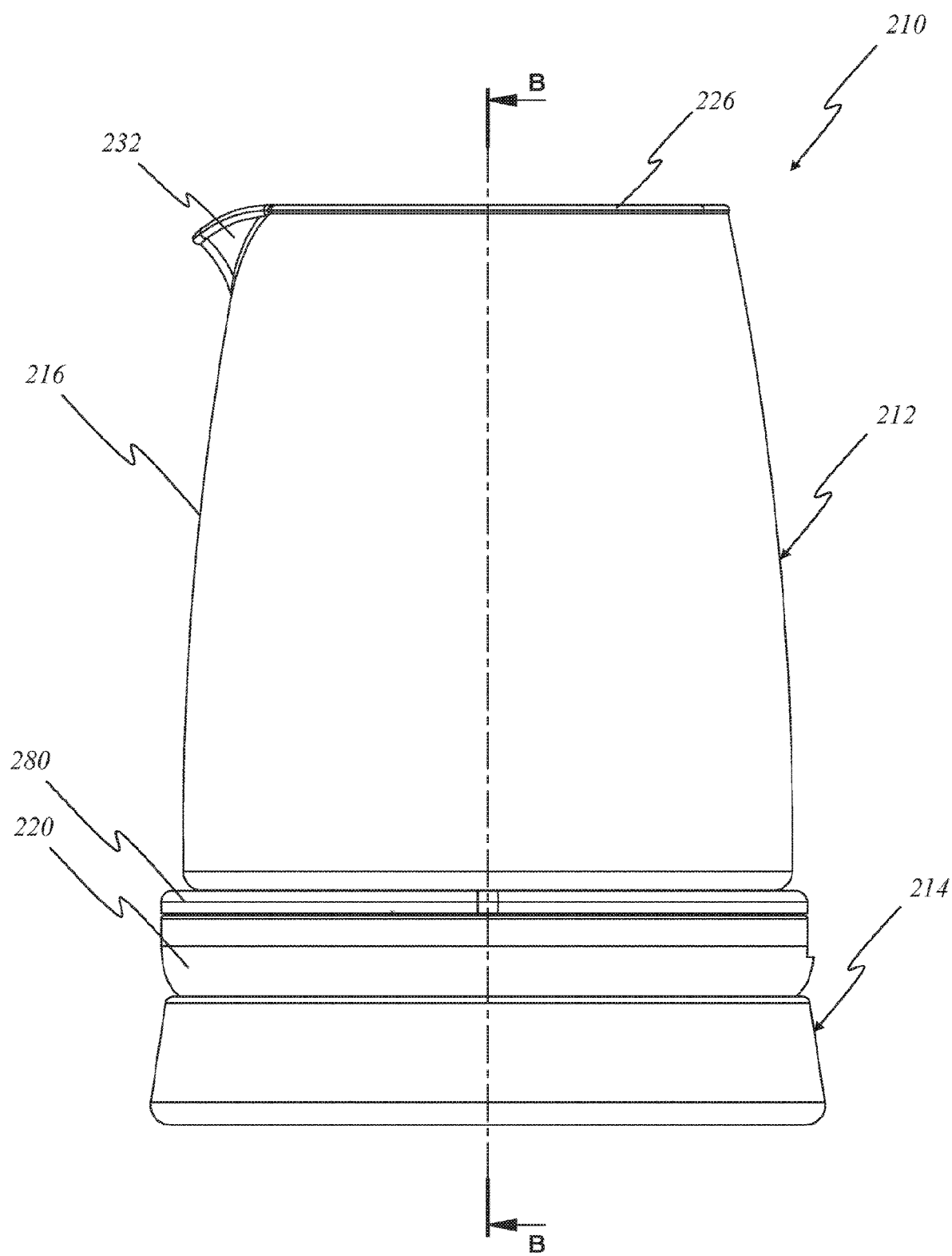
FIG. 8 is a schematic front view of the kettle of FIG. 7.

The jug 112 includes a hollow body 116 providing a generally central upright longitudinal axis 118. The body 116 includes a bottom housing 120 from which there upwardly extends a side wall 122. The body 116 also includes a handle 124 attached to the side wall 122. The side wall 122 provides a rim 126. The rim 126 surrounds an upper opening 128 that is closed by a cover or lid 130. The rim 126 provides a pouring lip 132 (FIG. 6). The side wall 122 may be formed of glass or other suitable material.

Figure 1:
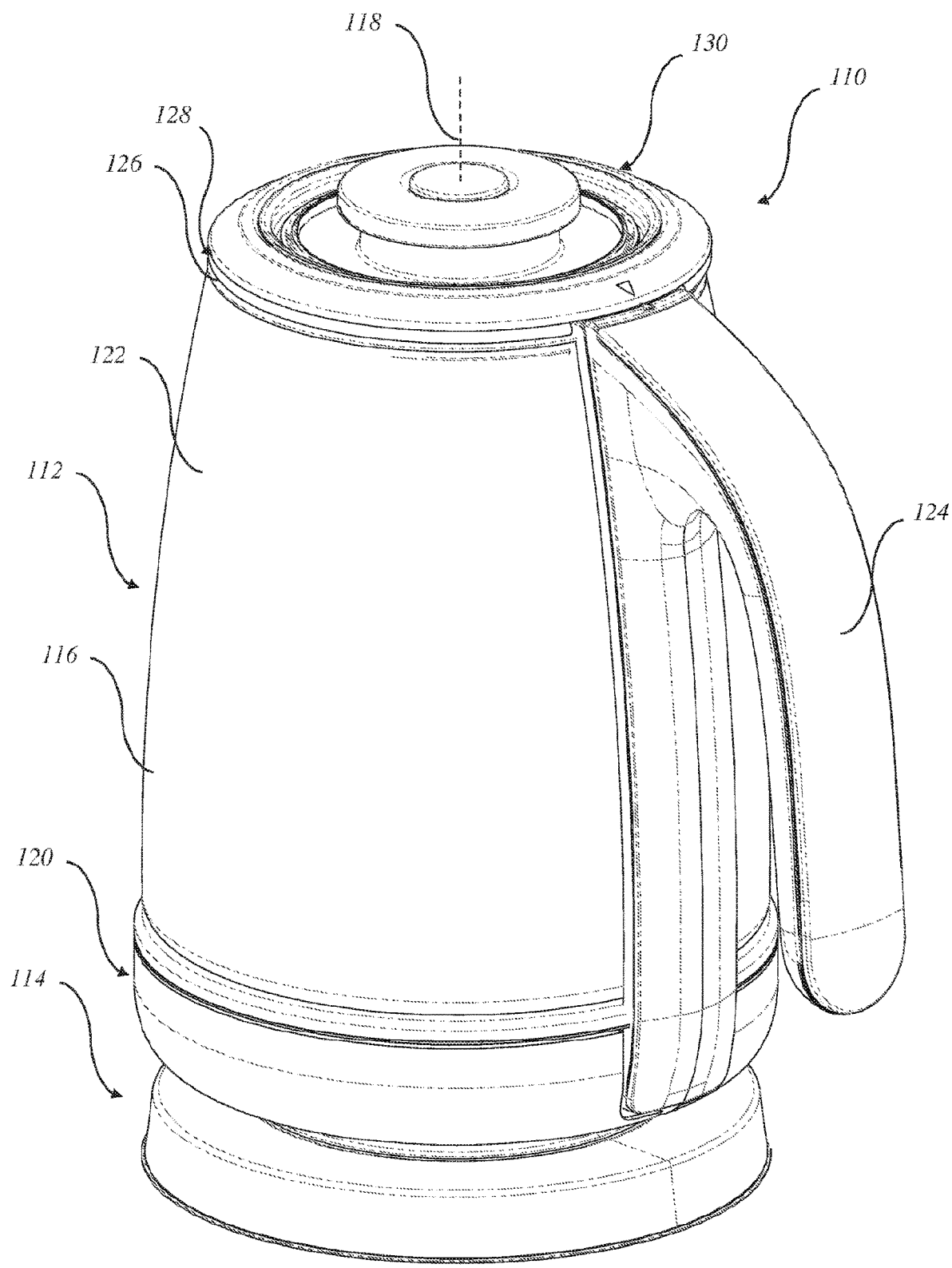
FIG. 1 is a schematic perspective view of a kettle according to an embodiment of the present invention.
Figure 2:
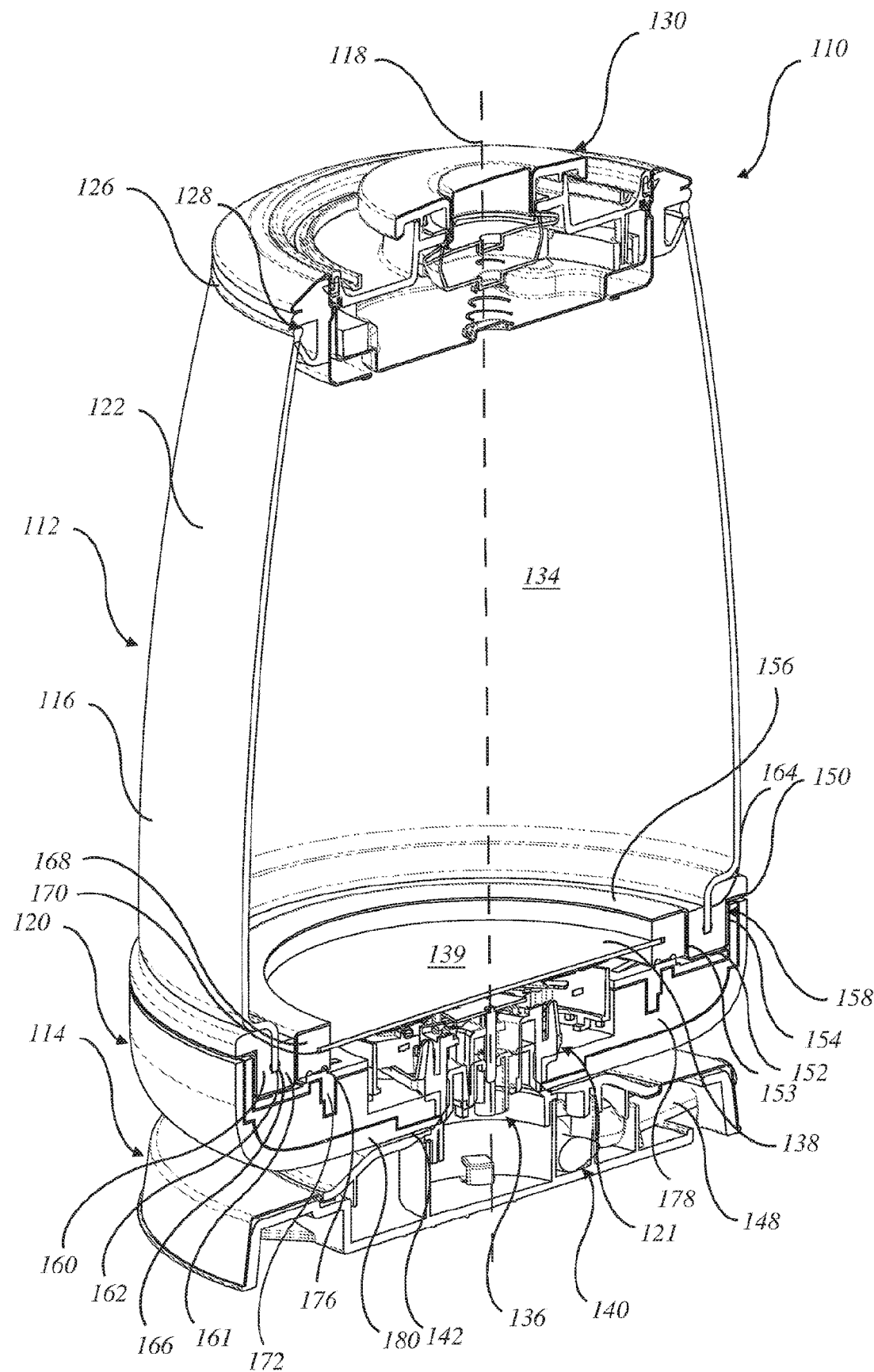
FIG. 2 is a schematic perspective section view taken longitudinally of the kettle of FIG. 1.
Figure 3:
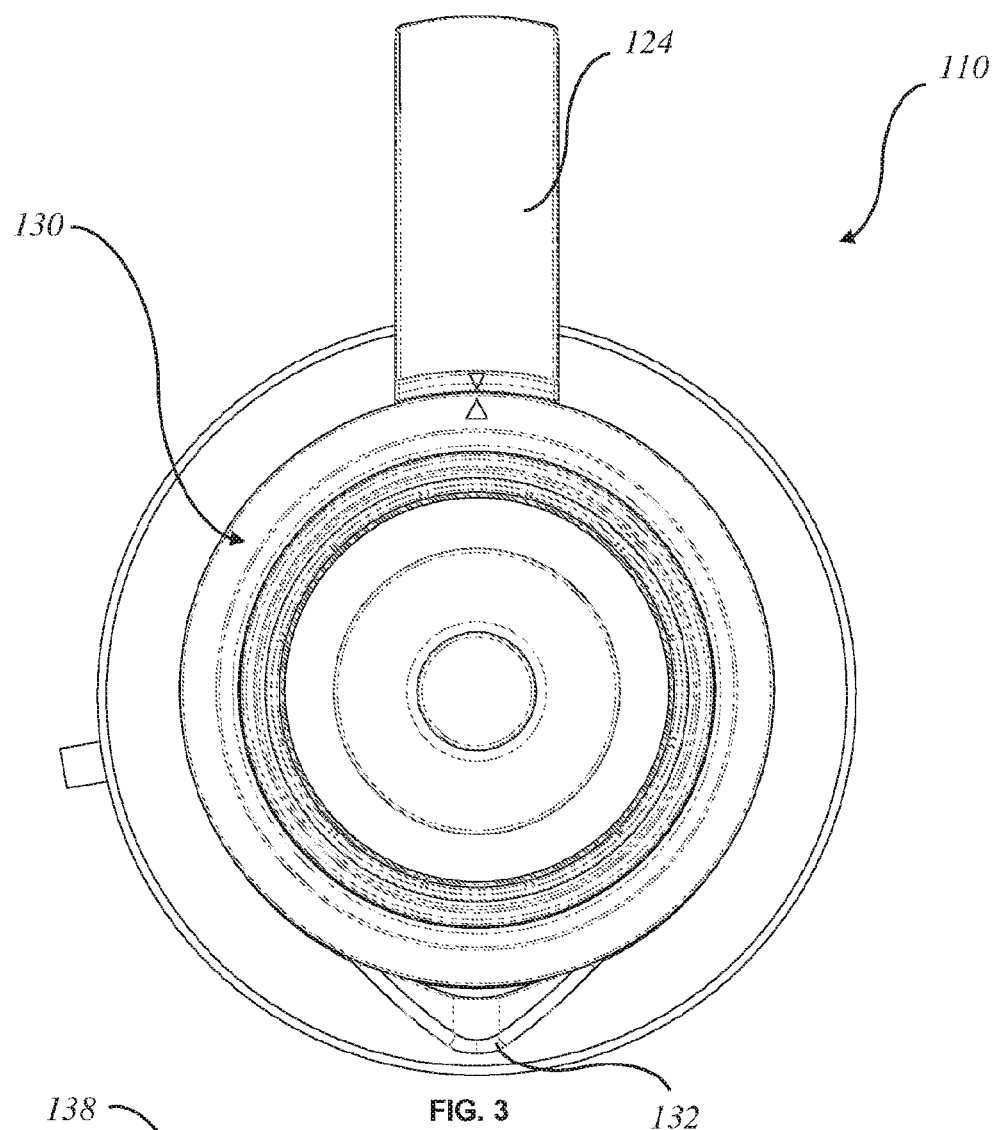
FIG. 3 is a top plan view of the kettle of FIG. 1.

With particular reference to FIGS. 2 and 6, the housing 120, side wall 122 and lid 130 surround a chamber 134 that is to receive the water to be heated. Located in the housing 120 is a controller 121 providing electrical connections that are engaged by electrical contacts 136 of the base 114, so that the base 114 is operable to provide the jug 112 with electric power for heating water contained in the jug 112.

To heat the water in the chamber 134, the jug 112 is provided with a heating element 138 in thermal communication with the chamber 134 so that heat generated by the element 138 can be delivered to the water via conduction. In the preferred embodiment, the element 138 provides a floor 139 of the jug 112 extending radially outwardly from the axis 118 such that the floor 139, together with the side wall 122 and lid 130, at least partially surround the chamber 134. In an alternative embodiment, the kettle 110 may provide a floor separate and distinct from the element 138.

The element 138 is operatively associated with the controller 121 so that the element 138 is electrically coupled to a power supply module 140 housed within the base 114 when the jug 112 is resting on the base 114. The module 140 is configured to supply power to the element 138 to resistively heat the element 138. In particular, the base 114 includes an upper surface 142 upon which the jug 112 rests. The upper surface 142 includes a locating projection in the form of a rotating electrical connector 144 (FIG. 5) providing the contacts 136. The connector 144 is configured to be received in a corresponding hole 146 located on an underside of the housing 120. The contacts 136 engage the connections of the controller 121 in the housing 120 via mating of the connector 144 with the hole 146 to supply power to the element 138 when the jug 112 is electrically coupled to the base 114. The element 138 is preferably in the form of a printed heating element to distribute heat generally evenly over a heating surface of the element to at least minimize occurrence of cavitation of the water as the water is heated.

The module 140 includes a micro-processor (not shown) and a power inlet 148. In one embodiment, a user interface (not shown) is provided to cooperate with the micro-processor to control the micro-processor.

The housing 120 provides a chassis 150 extending circumferentially around the element 138. The chassis 150 provides a bottom wall 152 and inner and outer sidewalls 153, 154 extending upwardly from the bottom wall 152. A flange 156 extends generally transversely from an upper portion of the inner sidewall 153 towards the axis 118. The bottom wall 152 and sidewalls 153, 154 at least partially surround a channel or recess 158 extending circumferentially. The recess 158 is configured to receive at least a portion 161 of a first deformable sealing member 160. The sealing member 160 includes a groove 162 extending generally upwardly and parallel with the axis 118. The groove 162 is configured to receive a lower portion 164 of the side wall 122 such that the portion 161 is located on either side of the lower portion 164. A spherical bulge 166 is provided at the lower portion 164 to cause pressure to be applied to walls of the groove 162 to secure the side wall 122 and to at least minimize water egress to outside the chamber 134.

Located below the flange 156 is a second deformable sealing member 168. The member 168 is inwardly positioned and concentrically arranged relative to the first sealing member 160. In the preferred embodiment, a transverse width dimension of the member 168 is generally equal to a transverse width dimension of the flange 156, and a vertical height dimension of the member 168 is generally equal to a vertical height dimension of the portion 161. The member 168 includes a slot 170 extending transverse relative to and towards the axis 118. The slot 170 is configured to receive a periphery of the element 138 such that the periphery of the element 138 is spaced inwardly from the lower portion 164 of the side wall 122.

The members 160, 168 are resiliently deformable to inhibit transmission of sound, caused by cavitation of the water as the water is heated, from the chamber 134 to the housing 120 and external of the chamber 134. In the preferred embodiment, the members 160, 168 are formed of silicone material, but it will be appreciated that the members may be formed of other suitable materials and may be formed of the same material or different materials.

The housing 120 also provides a support structure 172 generally located below the chassis 150 to support the chassis 150. The structure 172 is attached to the housing 120 by a set of fasteners, such as screws 174. The structure 172 provides a plurality of protrusions 176 to apply pressure locally on an underside of the second sealing member 168 to at least minimize water ingress to the controller 121 located in the housing 120. The support 172 is preferably formed of plastics. The amount of pressure placed on the sealing member 168 affects noise levels, that is, the lower the clamping force on the member 168 the quieter the kettle 110 during operation. The amount of compression on the member 168 is preferably between 0.3 mm and 2 mm in order to achieve a reliable seal whilst ensuring sound levels stay relatively low.

A sound-absorbing layer 178 is provided between the structure 172 and a bottom wall 180 of the housing 120 to further inhibit the transmission of the sound from the chamber 134. In the preferred embodiment, the layer 178 is formed of foam material.

The arrangement of the element 138, the members 160, 168, and the layer 178 act to absorb and dampen the sound energy caused by cavitation of the water to minimize or eliminate noise produced by the kettle 110 during operation. Further in combination, the distribution of heat on the printed circuit element reduces the likelihood of cavitation occurring relative to a conventional heating element, thereby further minimizing or eliminating noise produced by the kettle 110 during operation.

Figure 4:
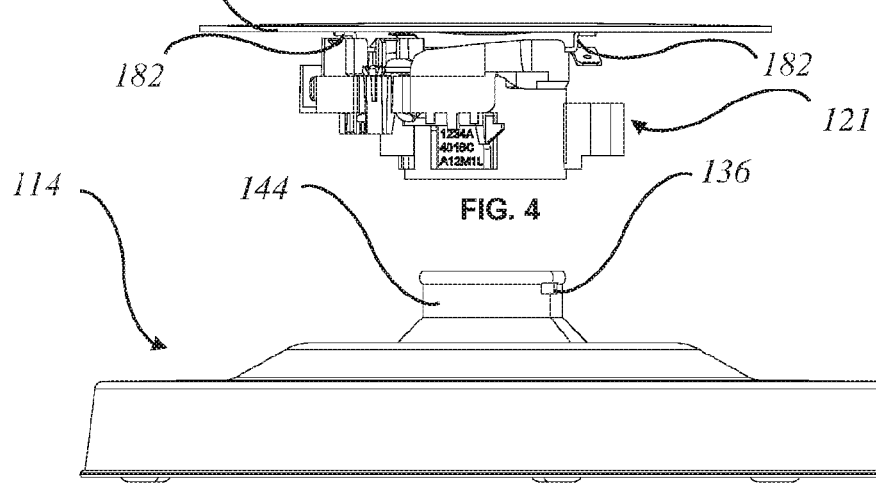
FIG. 4 is a side elevation view of a heating element and associated controller of the kettle of FIG. 1.
Figure 5:
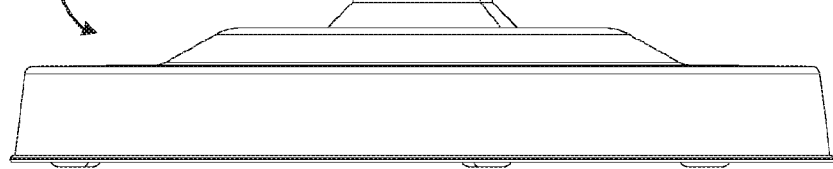
FIG. 5 is a side elevation view of a heater base of the kettle of FIG. 1.

As shown in FIG. 4, the controller 121 is not rigidly connected to the heating element 138 itself. Rather, contact between the controller 121 and the heating element 138 is via a plurality of electrical spring supports or contacts 182. The purpose of this is to minimize resonance from the heating element 138 through the controller 121 and into the base 114, thereby having a significant effect on noise levels of the kettle 110 during operation. Preferably, the contacts 182 are formed of resilient metal.

In FIGS. 7 to 18 of the accompanying drawings there is schematically depicted an appliance to heat water, preferably the appliance is a kettle 210. The kettle 210 includes a vessel or jug 212 and a heater base 214 upon which the jug 212 rests. The base 214 delivers electric power to the jug 212.

The jug 212 includes a hollow body 216 providing a generally central upright longitudinal axis 218. The body 216 includes a bottom housing 220 from which there upwardly extends a side wall 222. The side wall 222 includes a lower portion 224 located within the housing 220. The lower portion 224 is generally inclined towards the axis 218. The body 216 may also include a handle (not shown) attached to the side wall 222. The side wall 222 provides a rim 226. The rim 226 surrounds an upper opening 228 that is closed by a cover or lid (not shown). The rim 226 provides a pouring lip 232. The side wall 222 may be formed of glass or other suitable material.

Figure 9:
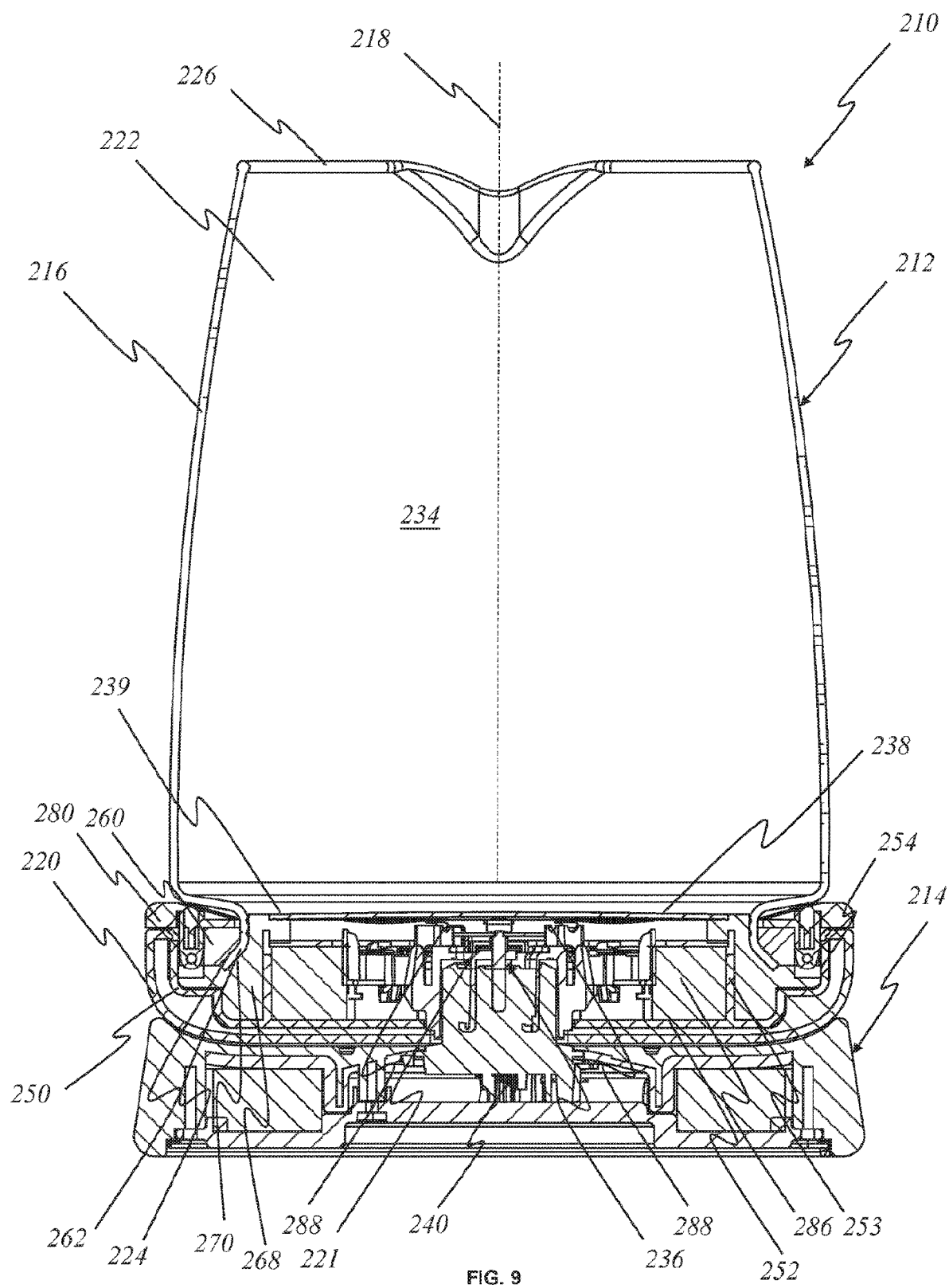
FIG. 9 is a schematic section view of the kettle taken along line B-B of FIG. 8.

With particular reference to FIG. 9, the housing 220, side wall 222 and lid surround a chamber 234 that is to receive the water to be heated. Located in the housing 220 is a controller 221 providing electrical connections that are engaged by electrical contacts 236 of the base 214, so that the base 214 is operable to provide the jug 212 with electric power for heating water contained in the jug 212.

To heat the water in the chamber 234, the jug 212 is provided with a heating element 238 in thermal communication with the chamber 234 so that heat generated by the element 238 can be delivered to the water via conduction. In the preferred embodiment, the element 238 provides a floor 239 of the jug 212 extending radially outwardly from the axis 218 such that the floor 239, together with the side wall 222 and lid, at least partially surround the chamber 234. In an alternative embodiment, the kettle 210 may provide a floor separate and distinct from the element 238.

Figure 10:
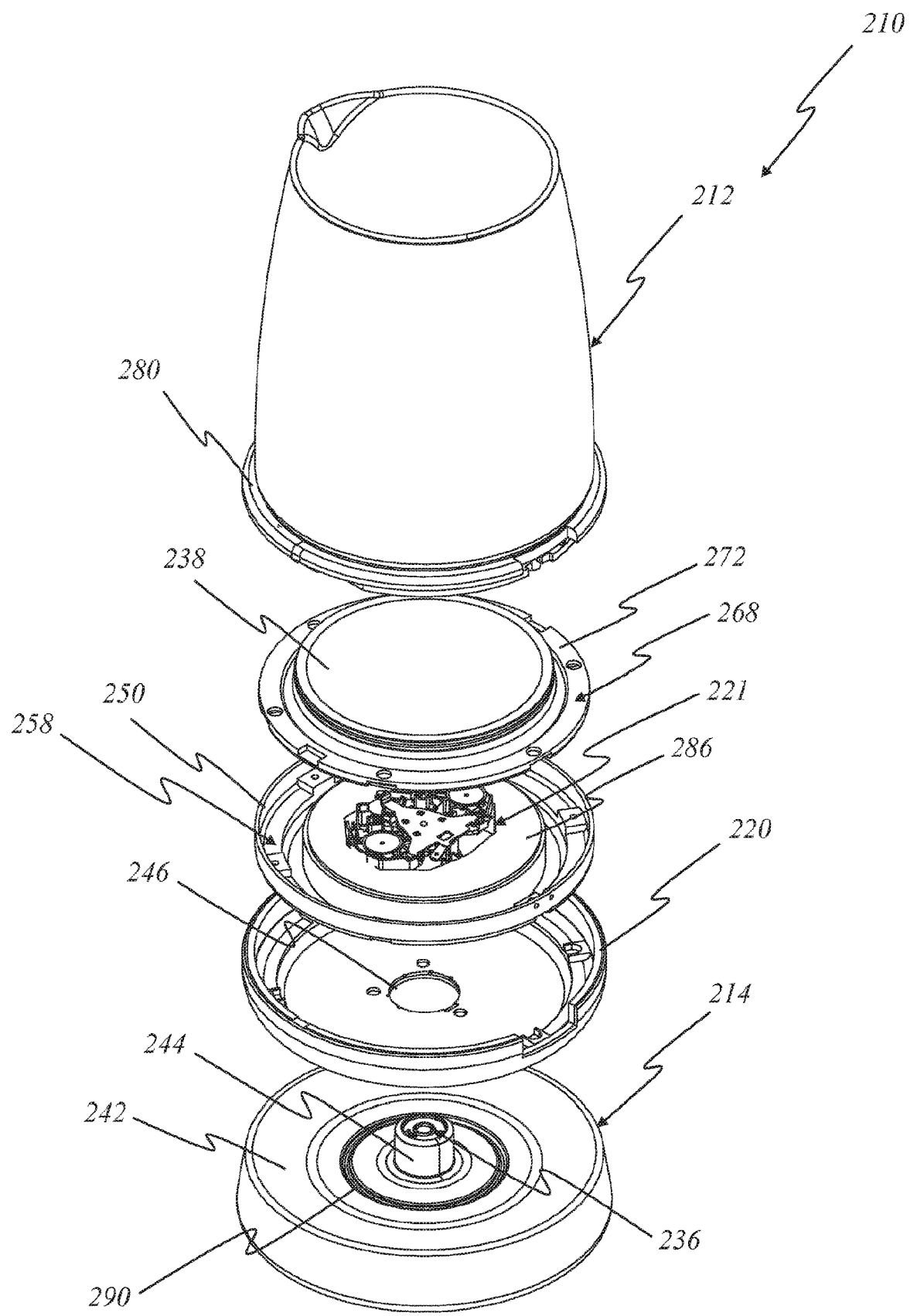
FIG. 10 is a schematic top in-line exploded parts view of the kettle of FIG. 7.
Figure 11:
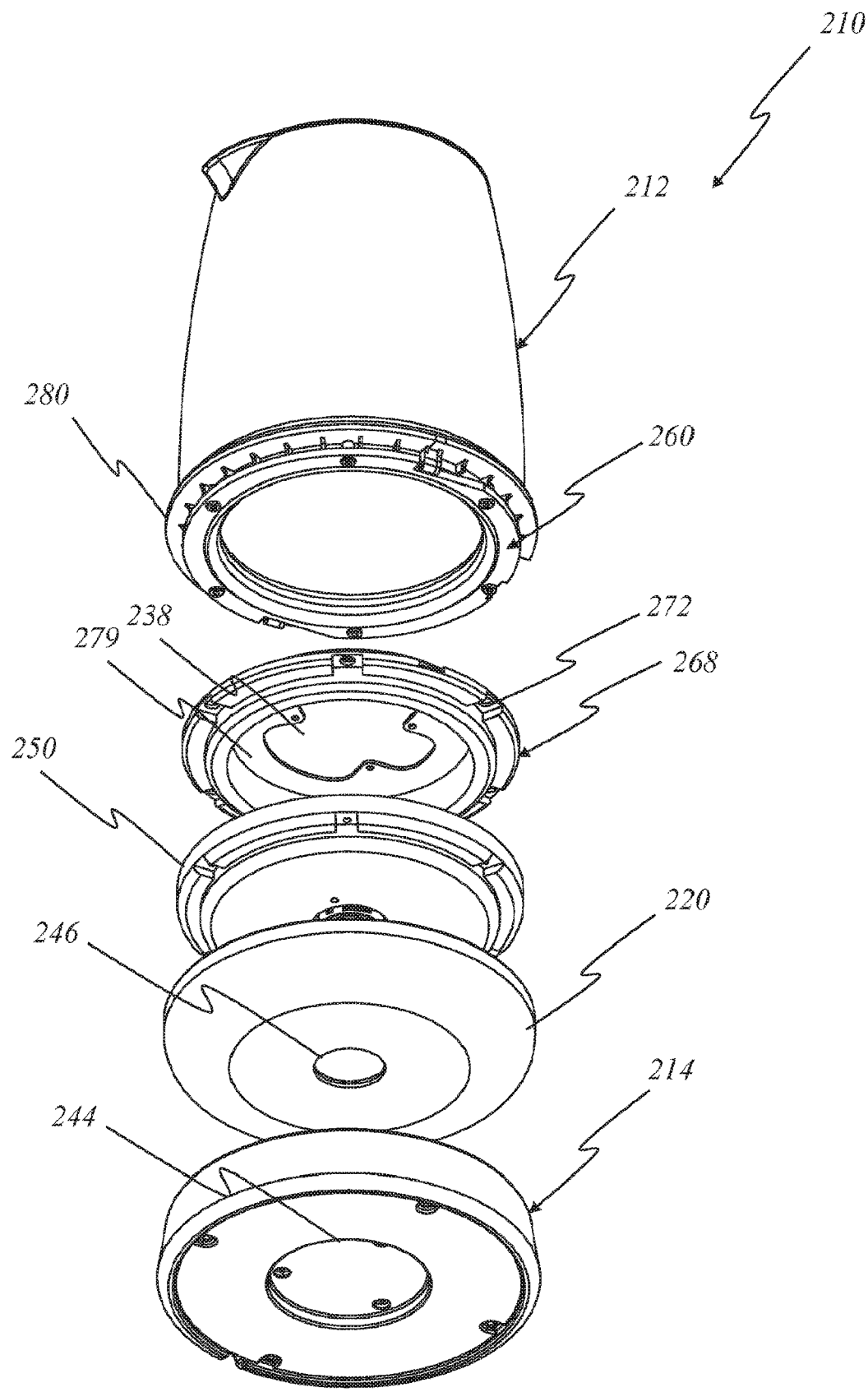
FIG. 11 is a schematic bottom in-line exploded parts view of the kettle of FIG. 7.
Figure 12:
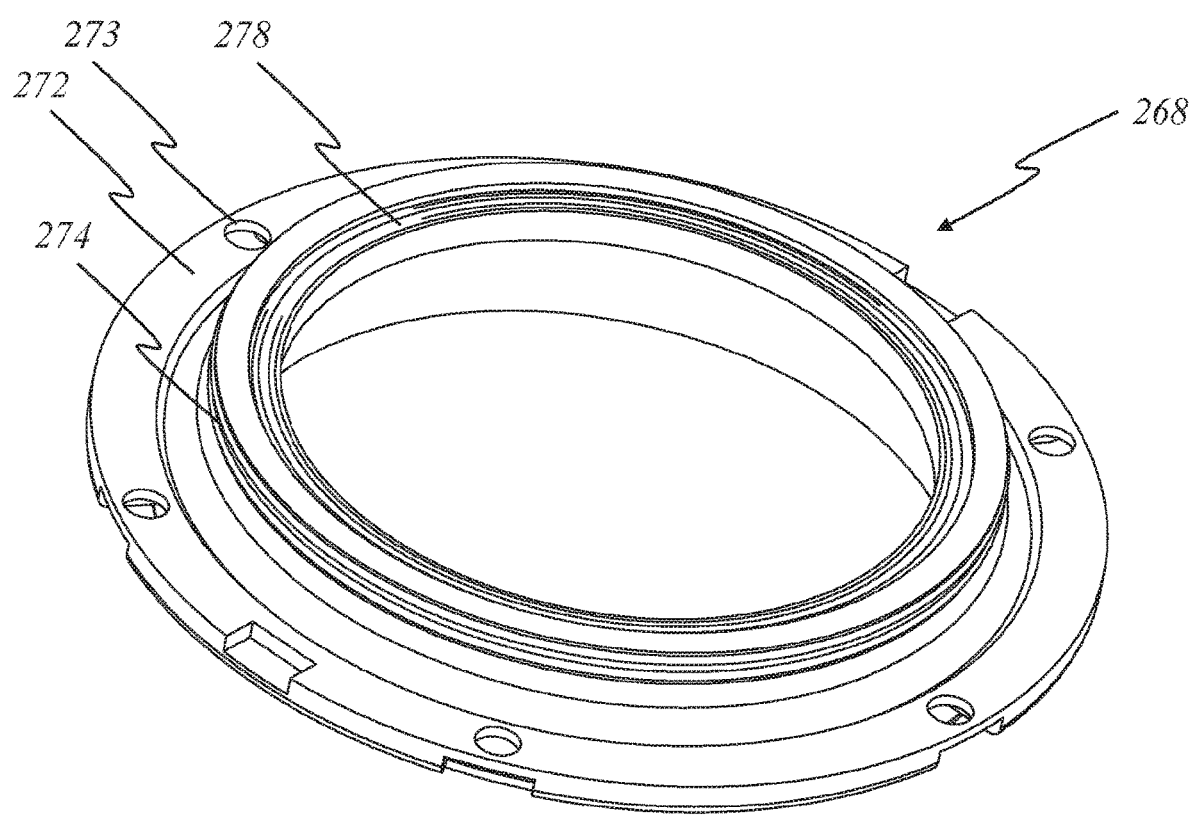
FIG. 12 is a schematic perspective view of a first sealing member of the kettle of FIG. 7.
Figure 13:
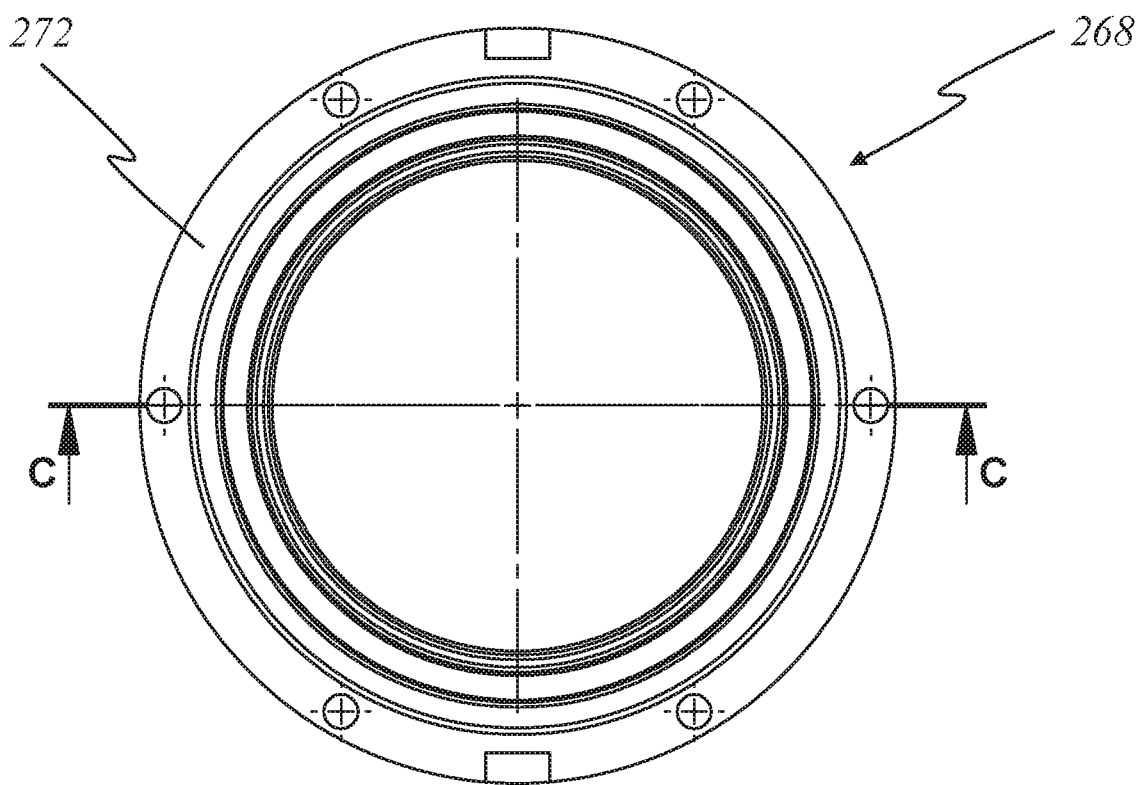
FIG. 13 is a schematic top view of the sealing member of FIG. 12.
Figure 14:
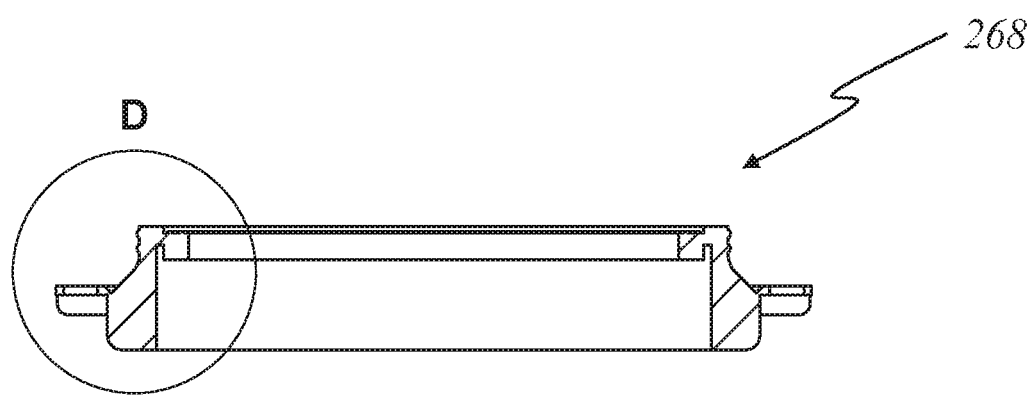
FIG. 14 is a schematic section view of the sealing member taken along line C-C of FIG. 13.

The element 238 is operatively associated with the controller 221 so that the element 238 is electrically coupled to a power supply module 240 housed within the base 214 when the jug 212 is resting on the base 214. The module 240 is configured to supply power to the element 238 to resistively heat the element 238. As shown in FIG. 10, the base 214 includes an upper surface 242 upon which the jug 212 rests. The upper surface 242 includes a locating projection in the form of a rotating electrical connector 244 providing the contacts 236. The connector 244 is configured to be received in a corresponding hole 246 through an underside of the housing 220. The contacts 236 engage the connections of the controller 221 in the housing 220 via mating of the connector 244 with the hole 246 to supply power to the element 238 when the jug 212 is electrically coupled to the base 214. The element 238 is preferably in the form of a printed heating element to distribute heat generally evenly over a heating surface of the element to at least minimize occurrence of cavitation of the water as the water is heated.

The module 240 includes a micro-processor (not shown) and a power inlet (not shown). In one embodiment, a user interface (not shown) is provided to cooperate with the micro-processor to control the micro-processor.

The housing 220 provides a chassis 250 extending circumferentially around the element 238. The chassis 250 provides a bottom wall 252 and inner and outer sidewalls 253, 254 extending circumferentially and upwardly from the bottom wall 252.

The bottom wall 252 and sidewalls 253, 254 at least partially surround a channel or recess 258 extending circumferentially. The recess 258 is configured to receive at least a portion of a first deformable sealing member 260. The sealing member 260 includes a sealing face 262 in sealing engagement with an outer surface of the lower portion 224 of the side wall 222. The sealing face 262 is generally co-inclined with the lower portion 224. The sealing member 260 also includes an annular flange 261 (FIG. 17) for attaching the member 260 to the chassis 250. The flange 261 includes a plurality of apertures 264.

Located in the recess 258 adjacent the inner sidewall 253 is a second deformable sealing member 268. The member 268 is inwardly positioned and concentrically arranged relative to the first sealing member 260. The member 268 includes a vessel sealing face 270 in sealing engagement with an inner surface of the lower portion 224 of the side wall 222. The vessel sealing face 270 is generally co-inclined with the lower portion 224. In this way, the lower portion 224 is sealingly positioned between the first and second sealing members 260, 268.

Figure 15:
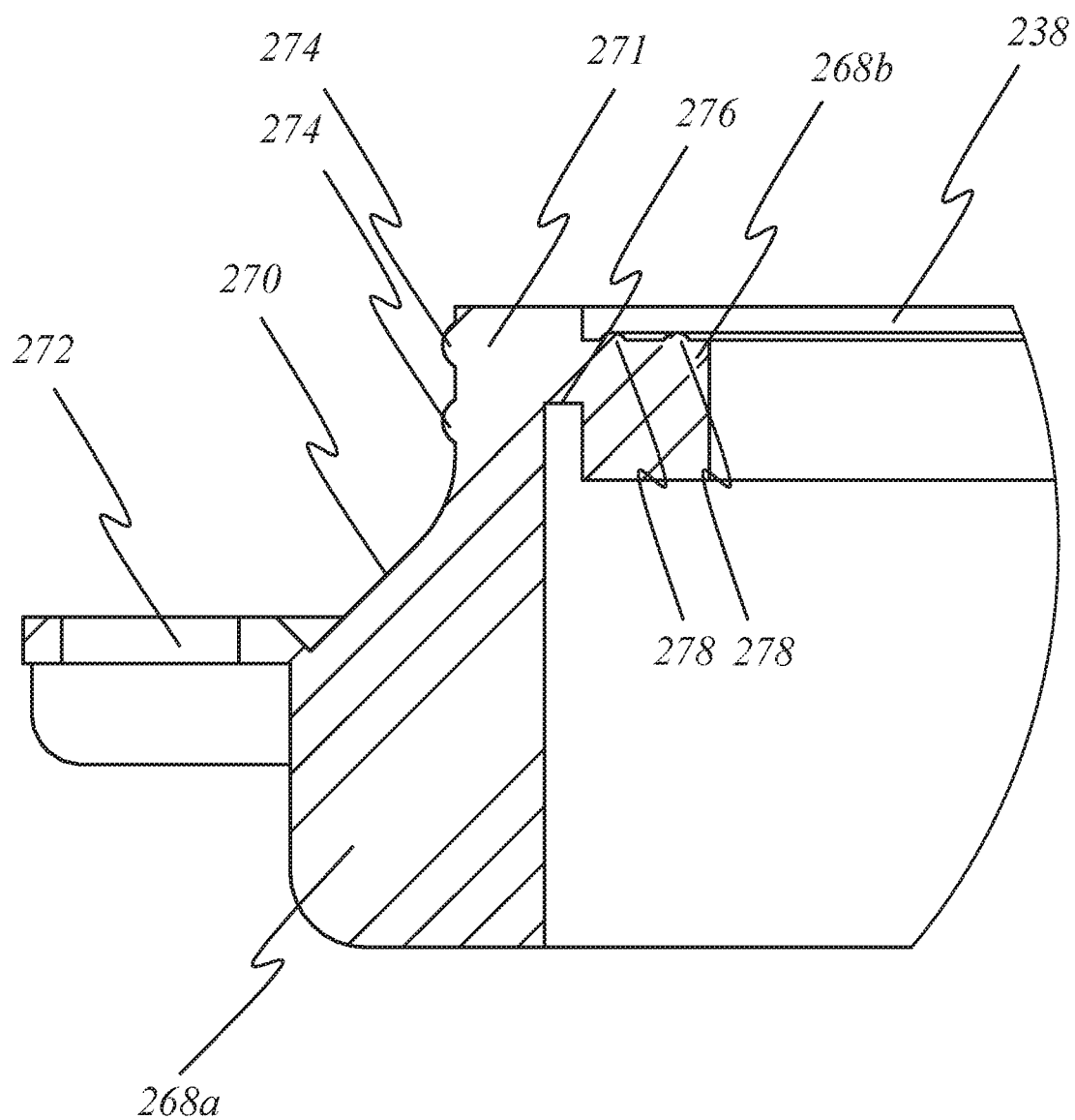
FIG. 15 is a schematic enlarged detail view of portion D of the sealing member of FIG. 14.
Figure 18:
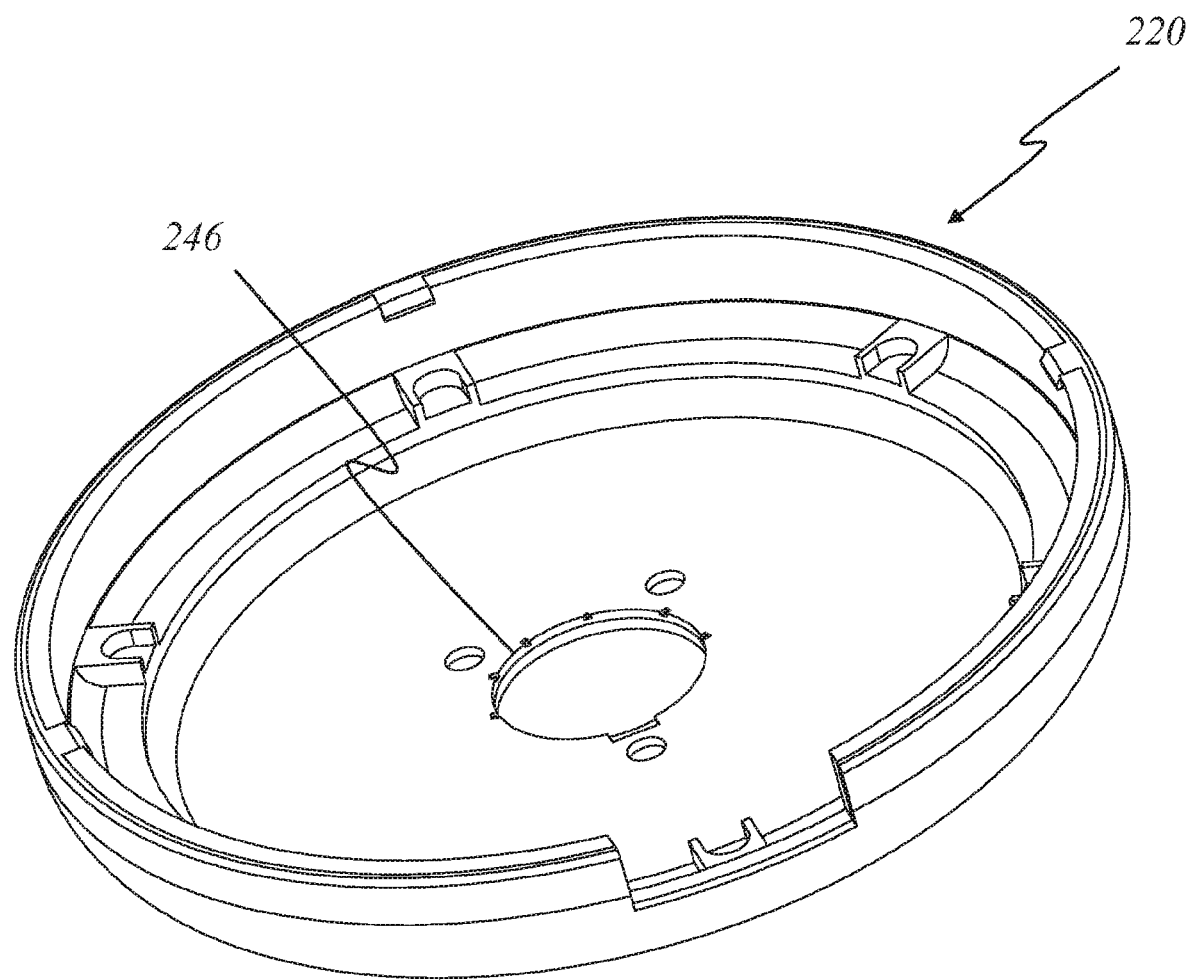
FIG. 18 is a schematic perspective view of a housing of the kettle of FIG. 7.

With particular reference to FIG. 15, the member 268 includes an outer portion 268a, an inner portion 268b, and a bridge portion 271 connecting the outer and inner portions 268a, 268b. The outer portion 268a includes the vessel sealing face 270. The outer portion 268a further includes an attachment portion 272 in the form of an annular flange to attach the member 268 to both the chassis 250 and the flange 261 of the first sealing member 260 such that the attachment portion 272 is located between the chassis 250 and the flange 261. The attachment portion 272 includes a plurality of apertures 273. The bridge portion 271 includes vessel sealing ribs 274 for sealingly engaging an inner surface of the side wall 222 adjacent the lower portion 224. The bridge portion 271 also includes a slot 276 for locating the member 268 on the inner sidewall 253. The inner portion 268a includes element sealing ribs 278 for sealingly engaging the element 238. In the preferred embodiment, the element 238 is mounted to the member 268 by way of an element clamp 279. It will be appreciated that the bridge portion 271 allows for vertical compliance in the member 268 by way of a bending moment. In a preferred embodiment, the member 268 has a shore hardness in the range of about 30 to 50 durometers.

The members 260, 268 are resiliently deformable to inhibit transmission of sound, caused by cavitation of the water as the water is heated, from the chamber 234 to the housing 220 and external of the chamber 234. In the preferred embodiment, the members 260, 268 are formed of silicone material, but it will be appreciated that the members may be formed of other suitable materials and may be formed of the same material or different materials. It will also be appreciated that the outer portion 268a may be designed to have an effective width suitable to inhibit transmission of the sound to the housing 220.

The kettle 210 also provides a support structure in the form of a compression ring 280 circumferentially surrounding the side wall 222. The ring 280 is attached to the chassis 250 by a set of fasteners, such as screws, locating within screw bosses 282 on an underside of the ring 280. The screw bosses 282 are received in the aligned apertures 264, 273 of the flanges 261, 272. The ring 280 provides a plurality of ribs or protrusions 284 circumferentially spaced on the underside of the ring 280 to apply pressure locally on an upper side of the first sealing member 260. In this way, screwing down the ring 280 against the chassis 250 causes compression between the sealing members 260, 268 and the lower portion 224 to at least minimize liquid egress from the chamber 234 as well as to inhibit transmission of sound from the chamber 234 to the housing 220 and external of the chamber 234. It will be appreciated that the magnitude of the compressive force placed on the sealing member 260 may be varied to minimize operating noise levels of the kettle 210. In a preferred embodiment, the amount of compression on the member 260 is preferably between 0.3 mm and 2 mm, and more preferably 0.75 mm, in order to achieve a reliable seal whilst ensuring sound levels stay relatively low. In the preferred embodiment, the compression ring 280 is formed of two halves (with one half shown in FIG. 16). Although it will be appreciated that the compression ring 280 may be formed as one piece.

A sound-absorbing layer 286 is provided between the element 239 and the bottom wall 252 of the chassis 250 to further inhibit the transmission of the sound from the chamber 234. In the preferred embodiment, the layer 286 is formed of foam material. In another embodiment, the layer 286 is formed of a rubber or silicone material.

As shown in FIG. 9, the controller 221 is not rigidly connected to the element 238. Rather, contact between the controller 221 and the heating element 238 is via a plurality of electrical spring supports or contacts 288. The purpose of this is to minimize resonance from the element 238 through the controller 221 and into the housing 220, thereby having a significant effect on noise levels of the kettle 210 during operation. Preferably, the contacts 288 are formed of resilient metal.

With particular reference to FIG. 10, the base 214 may be provided with an elastomeric seal 290 to sealingly engage the housing 220 adjacent the hole 246 to further inhibit transmission of the sound. In the preferred embodiment, the base 214 has a profile which is generally curved for supporting conformity with the housing 220 to further inhibit transmission of the sound.

In a preferred embodiment, the housing 220 is overmoulded to eliminate voids in the housing 220 and to at least aid in inhibiting transmission of sound. In another embodiment, the overmoulding and housing are separate components. The housing 220 preferably includes relatively thick wall sections having a relatively large mass which may also serve to inhibit transmission of the sound. In the preferred embodiment, the housing 220 is formed of high density plastics.

Figure 19:
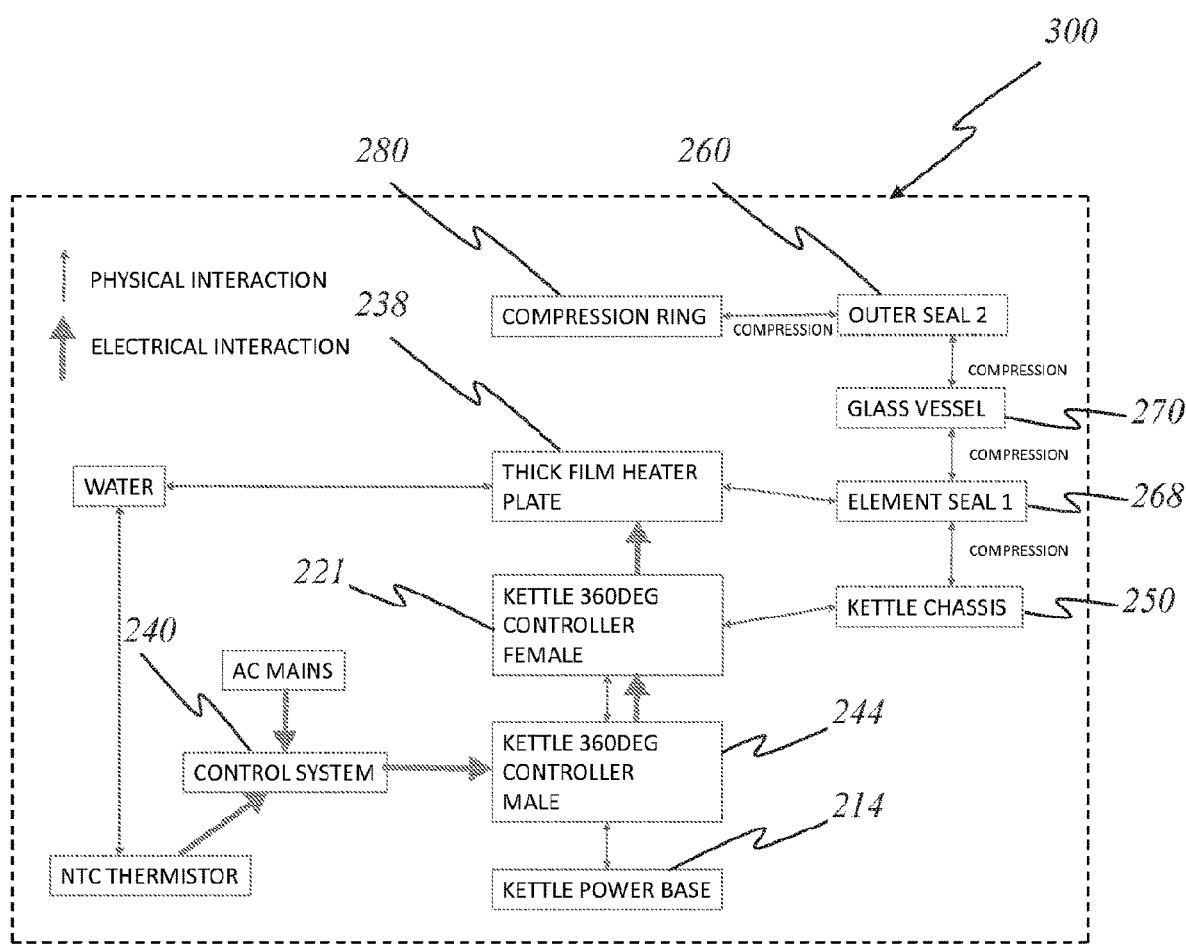
FIG. 19 is a block diagram illustrating communication between components of the kettle of FIG. 7.

Depicted in FIG. 19 is a block diagram illustrating various physical and electrical interactions between components of the kettle 210, with thickened arrows indicating an electrical interaction, and with thin arrows indicating a physical interaction. The compression ring 280 is in compressive physical contact with the first sealing member 260. The first sealing member 260 in turn is in compressive physical contact with the vessel sealing face 270. The vessel sealing face 270 is also in compressive physical contact with the second sealing member 268. The second sealing member 268 is in compressive physical contact with the chassis 250 and further in physical contact with the heating element 238. The chassis 250 is in physical contact with the electrical contacts 236. The heating element 238 electrically interacts with the controller 221 whilst being configured to be in physical contact with the water inside the jug 212. The controller 221 both electrically and physically interact with the rotating electrical connector 244. The rotating electrical connector 244 electrically interacts with the power supply module 240 whilst being in physical contact with the heater base 214. The power supply module 240 is configured to electrically interact with both AC mains to supply power to the kettle 210 as well as a sensor (not shown), such as an NTC thermistor, of the kettle 210. The NTC thermistor is configured to be in physical contact with the water inside the jug 212.

The arrangement of the base 214, housing 220, element 238, members 260, 268, and layer 286 act to absorb and dampen the sound energy caused by cavitation of the water to minimize or eliminate noise produced by the kettle 210 during operation. Further in combination, the distribution of heat on the printed circuit element reduces the likelihood of cavitation occurring relative to a conventional heating element, thereby further minimizing or eliminating noise produced by the kettle 210 during operation.

Although the invention has been described with reference to a specific example, it will be appreciated by those skilled in the art that the invention may be embodied in other forms.

| Item List | |
|---|---|
| 110 | kettle |
| 112 | jug |
| 114 | heater base |
| 116 | hollow body |
| 118 | axis |
| 120 | bottom housing |
| 121 | controller |
| 122 | side wall |
| 124 | handle |
| 126 | rim |
| 128 | upper opening |
| 130 | lid |
| 132 | pouring lip |
| 134 | chamber |
| 136 | electrical contacts |
| 138 | heating element |
| 139 | floor |
| 140 | power supply module |
| 142 | upper surface |
| 144 | rotating electrical connector |
| 146 | hole |
| 148 | power inlet |
| 150 | chassis |
| 152 | bottom wall |
| 153 | inner sidewall |
| 154 | outer sidewall |
| 156 | flange |
| 158 | recess |
| 160 | first sealing member |
| 161 | portion of sealing member |
| 162 | groove |
| 164 | lower portion |
| 166 | spherical bulge |
| 168 | second sealing member |
| 170 | slot |
| 172 | support structure |
| 174 | screws |
| 176 | protrusions |
| 178 | sound-absorbing layer |
| 180 | bottom wall |

| Item List | |
|---|---|
| 182 | electrical spring contacts |
| 210 | kettle |
| 212 | jug |
| 214 | heater base |
| 216 | hollow body |
| 218 | axis |
| 220 | bottom housing |
| 221 | controller |
| 222 | side wall |
| 224 | lower portion of side wall |
| 226 | rim |
| 228 | upper opening |
| 232 | pouring lip |
| 234 | chamber |
| 236 | electrical contacts |
| 238 | heating element |
| 239 | floor |
| 240 | power supply module |
| 242 | upper surface |
| 244 | rotating electrical connector |
| 246 | hole |
| 250 | chassis |
| 252 | bottom wall |
| 253 | inner sidewall |
| 254 | outer sidewall |
| 258 | recess |
| 260 | first sealing member |
| 261 | flange |
| 262 | sealing face |
| 264 | apertures of first sealing member |
| 268 | second sealing member |
| 268a | outer portion |
| 268b | inner portion |
| 270 | vessel sealing face |
| 271 | bridge portion |
| 272 | attachment portion |
| 273 | apertures of second sealing member |
| 274 | vessel sealing ribs |
| 276 | slot |
| 278 | element sealing ribs |
| 279 | element clamp |
| 280 | compression ring |
| 282 | screw bosses |
| 284 | protrusions |
| 286 | sound-absorbing layer |
| 288 | electrical spring contacts |
| 290 | seal |
| 300 | block diagram |

The invention claimed is:

1. An appliance to heat a liquid, the appliance including:
a vessel to receive the liquid to be heated, the vessel including a hollow body having a generally central upright longitudinal axis, the hollow body including a bottom housing, and a side wall extending upwardly from the bottom housing, with a portion of the bottom housing and side wall at least partly enclosing a chamber within which the liquid is heated, wherein the side wall includes a lower portion located within the bottom housing, with the lower portion being inclined towards the longitudinal axis; and
a heating element in thermal communication with the chamber so that heat generated by the heating element can be delivered to the liquid via convection;
a first deformable sealing member sealingly associated with the side wall to sealingly connect the side wall and bottom housing, with the first deformable sealing member inhibiting transmission of sound from the chamber, wherein the first deformable sealing member includes a first sealing face in sealing engagement with an outer surface of the lower portion, the first sealing face being generally co-inclined with the lower portion;

a second deformable sealing member sealingly associated with the heating element to sealingly connect the heating element and bottom housing, with the second deformable sealing member inhibiting transmission of sound from the chamber; and a compression member adapted to apply pressure locally to one or both of the first and second deformable sealing members so as to cause compression between the first and second deformable sealing members and the lower portion of the side wall to at least minimize liquid egress from the chamber, wherein the compression member is a compression ring.

2. The appliance of claim 1, wherein the bottom housing includes a support structure having a plurality of protrusions to apply pressure locally on an underside of the second deformable sealing member to inhibit transmission of sound from the chamber to the bottom housing.

3. The appliance of claim 1, wherein the second deformable sealing member sealingly connects the heating element, side wall and bottom housing, with a portion of the side wall being located between the first deformable sealing member and the second deformable sealing member.

4. The appliance of claim 1, wherein the first and second deformable sealing members and the compression member inhibit transmission of sound from the chamber to the bottom housing.

5. The appliance of claim 1, wherein the second deformable sealing member includes a second sealing face in sealing engagement with an inner surface of the lower portion.

6. The appliance of claim 5, wherein the second deformable sealing member includes an outer portion, an inner portion, and a bridge portion connecting the outer and inner portions, with the outer portion providing the second sealing face.

7. The appliance of claim 1, wherein the compression ring circumferentially surrounds the side wall of the hollow body.

8. The appliance of claim 6, wherein the outer portion of the second deformable sealing member includes an attachment portion to attach the second deformable sealing member to the first deformable sealing member.

9. The appliance of claim 8, wherein the inner portion of the second deformable sealing member includes one or more element sealing ribs for sealingly engaging the heating element.

10. The appliance of claim 6, wherein the bridge portion of the second deformable sealing member includes one or more vessel sealing ribs for sealingly engaging an inner surface of the side wall.

11. The appliance of claim 1, wherein the bottom housing includes a chassis extending circumferentially around the heating element, and the chassis provides a bottom wall.

12. The appliance of claim 11, further including a sound-absorbing layer located between the heating element and the bottom wall to further inhibit transmission of sound from the chamber.

13. The appliance of claim 12, wherein the sound-absorbing layer is formed of foam material.

14. The appliance of claim 12, further including a controller to supply power to the heating element, with the controller being arranged between the sound-absorbing layer and the bottom housing.

15. The appliance of claim 14, wherein the heating element is resiliently supported by the controller to at least minimise resonance from the heating element.

16. The appliance of claim 1, wherein the heating element is a printed heating element to distribute heat generally evenly over a heating surface of the heating element to at least minimize occurrence of cavitation of the liquid as the liquid is heated.

17. The appliance of claim 1, wherein the first and second deformable sealing members are resiliently deformable.

18. The appliance of claim 1, wherein the bottom housing is overmoulded to at least aid in inhibiting transmission of sound.

* * * * *